United States Patent
Arai et al.

(10) Patent No.: US 6,831,875 B2
(45) Date of Patent: Dec. 14, 2004

(54) APPARATUS FOR ULTRASONICALLY DETECTING POSITION OF WEB EDGE AND METHOD OF DOING THE SAME

(75) Inventors: Hiroaki Arai, Tokyo (JP); Eiichi Kanno, Tokyo (JP)

(73) Assignee: Nireco Corporation, Tokyo (JP)

( * ) Notice: Subject to any disclaimer, the term of this patent is extended or adjusted under 35 U.S.C. 154(b) by 0 days.

(21) Appl. No.: 10/687,765

(22) Filed: Oct. 20, 2003

(65) Prior Publication Data

US 2004/0081022 A1 Apr. 29, 2004

(51) Int. Cl.[7] .............................. G01S 3/80; G01B 17/00
(52) U.S. Cl. ........................ 367/124; 367/907; 73/612; 73/159
(58) Field of Search .............................. 367/124, 125, 367/126, 118, 907; 73/159, 612

(56) References Cited

U.S. PATENT DOCUMENTS

| | | | |
|---|---|---|---|
| 5,126,946 A | | 6/1992 | Ko |
| 5,161,126 A | * | 11/1992 | Marcus ........................ 367/99 |
| 5,565,627 A | * | 10/1996 | Dorr ............................ 73/599 |
| 5,583,828 A | * | 12/1996 | Arai et al. ................... 367/118 |
| 6,289,729 B1 | * | 9/2001 | Haque et al. ................. 73/159 |

FOREIGN PATENT DOCUMENTS

| | | |
|---|---|---|
| JP | 6-105172 | 4/1994 |
| JP | 2856066 | 11/1998 |
| JP | 2924641 | 5/1999 |
| JP | 2003-97933 | 4/2003 |

* cited by examiner

Primary Examiner—Ian J. Lobo
(74) Attorney, Agent, or Firm—McGinn & Gibb, PLLC

(57) ABSTRACT

An apparatus for ultrasonically detecting an edge of a web, includes a ultrasonic-wave transmitter transmitting ultrasonic-wave pulse train, a ultrasonic-wave receiver receiving the ultrasonic-wave pulse train and converting the received ultrasonic-wave pulse train into electric signals, the web being fed between the ultrasonic-wave transmitter and receiver, a rectifying circuit for rectifying the electric signals, a low-pass filter circuit for smoothing output signals transmitted from the rectifying circuit, a first sample-holding circuit for sampling an output signal transmitted from the low-pass filter circuit, at first timing, a second sample-holding circuit for sampling an output signal transmitted from the low-pass filter circuit, at second timing later than the first timing, a third sample-holding circuit for sampling an output signal transmitted from the first sample-holding circuit, at the second timing, and a differentially amplifying circuit for calculating a difference between output signals transmitted from the second and third sample-holding circuits.

4 Claims, 4 Drawing Sheets

APPARATUS FOR ULTRASONICALLY DETECTING POSITION OF WEB EDGE AND METHOD OF DOING THE SAME

BACKGROUND OF THE INVENTION

1. Field of the Invention

The invention relates to an apparatus for detecting a position of an edge of a web by detecting cutoff of ultrasonic-waves transmitting from an ultrasonic-wave transmitter to an ultrasonic-wave receiver, which cutoff is caused by a web being fed between the ultrasonic-wave transmitter and the ultrasonic-wave receiver.

2. Description of the Related Art

In an apparatus for detecting an edge of a web by means of a ultrasonic-wave transmitter and a ultrasonic-wave receiver, ultrasonic-waves are intermittently transmitted from a ultrasonic-wave transmitter such that a period of time in which ultrasonic-waves are not transmitted is longer than a period of time in which reflected ultrasonic-waves are attenuated, in order to prevent a ultrasonic-wave receiver from being influenced by unnecessary reflected ultrasonic-waves.

For instance, in the apparatuses for detecting an edge of a web, suggested in Japanese Patents Nos. 2856066 and 2924641, a peak in signals transmitted from an ultrasonic-wave receiver is detected, and an edge of a web is detected, based on the thus detected peak.

In the apparatus for detecting an edge of a web, suggested in Japanese Patent Publication No. 6-105172 (B1), only third to fifth cycles of signals transmitted from an ultrasonic-wave receiver are selected in order to eliminate influences exerted by ultrasonic-waves transmitted from an ultrasonic-wave transmitter and making a detour to an ultrasonic-wave receiver. A peak is detected in the received ultrasonic-waves in the third to fifth cycles, and an edge of a web is detected, based on the peak.

In an ultrasonic-wave transmitter, even if a driving pulse voltage is stopped to be applied to the ultrasonic-wave transmitter after once applied, there remains reverberant vibration in the ultrasonic-wave transmitter. When an ultrasonic-wave transmitter with small reverberation vibration is used, an amplitude of an output signal transmitted from a ultrasonic-wave receiver, influenced by reverberant vibration and unnecessary reflected ultrasonic-waves, is smaller than an amplitude of direct waves. Hence, by using a ultrasonic-wave transmitter with small reverberant vibration, it would be possible to detect an edge of a web, based on a peak of output signals transmitted from a ultrasonic-wave receiver.

In contrast, when a ultrasonic-wave transmitter with high reverberant vibration is used, an amplitude of an output signal transmitted from a ultrasonic-wave receiver on receipt of ultrasonic-waves transmitted from a ultrasonic-wave transmitter while a driving pulse voltage is being applied to the ultrasonic-wave transmitter is sometimes greater than an amplitude of an output signal transmitted from a ultrasonic-wave receiver on receipt of ultrasonic-waves caused by reverberant vibration after application of a driving pulse voltage to the ultrasonic-wave transmitter has been stopped.

However, the ultrasonic-waves caused by reverberant vibration are unstable, and hence, is likely to be influenced by reflected ultrasonic-waves. Thus, it is necessary to sample only ultrasonic-waves transmitted from a ultrasonic-wave transmitter while a driving pulse voltage is applying to the ultrasonic-wave transmitter.

FIG. 1 illustrates waveforms of signals transmitted from a ultrasonic-wave receiver. Specifically, FIG. 1-(A) illustrates a waveform of a gate signal, FIG. 1-(B) illustrates a waveform Vt0 of an output signal transmitted from a ultrasonic-wave receiver at a temperature Ta equal to a certain temperature T, FIG. 1-(C) illustrates a waveform Vt1 of an output signal transmitted from a ultrasonic-wave receiver at a temperature Ta higher than the temperature T, and FIG. 1-(D) illustrates a waveform Vt2 of an output signal transmitted from a ultrasonic-wave receiver at a temperature Ta lower than the temperature T.

As illustrated in FIG. 1-(C), the higher the temperature Ta is, earlier the output signal starts being transferred, and as illustrated in FIG. 1-(D), the lower the temperature Ta is, later the output signal starts being transferred. That is, a velocity at which ultrasonic-waves are transferred in air is dependent on ambient temperature.

Hence, in the apparatus suggested in the above-mentioned Japanese Patent Publication No. 6-105172 (B1) in which a peak is detected when a certain period of time has passed after ultrasonic-waves had been transmitted, if ambient temperature much varies, a velocity at which ultrasonic-waves are transferred in air also varies, and hence, an output signal transmitted from a ultrasonic-wave receiver is shifted relative to a specific duration, that is, a period of time in which a gate signal is applied. As a result, as a peak is detected a waveform Vt1 or Vt2 both different from a waveform Vt0 which should be detected.

To avoid this problem, U.S. Pat. No. 5,126,946 discloses the apparatus designed to include a thermister for selecting a sampling area in accordance with ambient temperature.

However, the apparatus is useful only when ambient temperature gradually varies. The apparatus is not useful for air convection in which temperature rapidly varies, and further, not useful when a temperature profile is not uniform.

SUMMARY OF THE INVENTION

In view of the above-mentioned problems in the conventional apparatuses, it is an object of the present invention to provide an apparatus for ultrasonically detecting an edge of a web being fed between a ultrasonic-wave transmitter and a ultrasonic-wave receiver which apparatus is capable of transmitting and receiving ultrasonic-waves for accurately detecting an edge of a web without being influenced by reverberation vibration and reflected ultrasonic-waves, even if a time necessary for ultrasonic-waves to reach a ultrasonic-wave receiver from a ultrasonic-wave transmitter varies.

It is also an object of the present invention to provide a method of ultrasonically detecting an edge of a web being fed between a ultrasonic-wave transmitter and a ultrasonic-wave receiver which method of capable of doing the same.

In one aspect of the present invention, there is provided an apparatus for ultrasonically detecting an edge of a web, including a ultrasonic-wave transmitter transmitting ultrasonic-wave pulse train, a ultrasonic-wave receiver arranged in facing relation to the ultrasonic-wave transmitter, receiving the ultrasonic-wave pulse train, and converting the received ultrasonic-wave pulse train into electric signals, the web being fed between the ultrasonic-wave transmitter and the ultrasonic-wave receiver, a rectifying circuit for rectifying the electric signals, a low-pass filter circuit for smoothing output signals transmitted from the rectifying circuit, a first sample-holding circuit for sampling an output signal transmitted from the low-pass filter circuit, at first timing, a second sample-holding circuit for sampling an output signal transmitted from the low-pass filter circuit, at second timing later than the first timing, a third sample-holding circuit for sampling an output signal transmitted from the first sample-holding circuit, at the second timing, and a differentially amplifying circuit for calculating a difference between an output signal transmitted from the second sample-holding circuit and an output signal transmitted from the third sample-holding circuit.

On receipt of ultrasonic-wave pulse train from the ultrasonic-wave transmitter, the ultrasonic-wave receiver converts the received ultrasonic-waves into electric signals, which are rectified by the rectifying circuit. The rectified electric signals are smoothed by the low-pass filter circuit. The first sample-holding circuit samples an output signal transmitted from the low-pass filter circuit at first timing. The second sample-holding circuit samples an output signal transmitted from the low-pass filter circuit, at second timing later than the first timing, and the third sample-holding circuit samples an output signal transmitted from the first sample-holding circuit, at the second timing. The differentially amplifying circuit calculates a difference between an output signal transmitted from the second sample-holding circuit and an output signal transmitted from the third sample-holding circuit.

An amplitude of an output signal transmitted from the ultrasonic-wave receiver almost proportionally increases while the ultrasonic-wave receiver receives ultrasonic-waves directly driven by driving pulses applied to the ultrasonic-wave transmitter. The inventors experimentally found out that signals obtained by rectifying output signals transmitted from the ultrasonic-wave receiver and further smoothing the signals by mean of the low-pass filter circuit linearly increase. Hence, by taking two samples in a range in which the smoothed signals linearly increase, and calculating a level difference between the two samples, it would be possible to accurately detect an edge of a web without being influenced by reverberant vibration and reflected ultrasonic-waves, even if a time necessary for ultrasonic-waves to reach the ultrasonic-wave receiver from the ultrasonic-wave transmitter varies due to temperature variance.

The two sampling points are selected in a range in which the smoothed electric signals linearly increase, that is, a range in which the ultrasonic-wave receiver receives ultrasonic-waves directly driven by driving pulses, even if a time necessary for ultrasonic-waves to reach the ultrasonic-wave receiver from the ultrasonic-wave transmitter varies due to temperature variance in an expected range.

In another aspect of the present invention, there is provided a method of ultrasonically detecting an edge of a web, by detecting cutoff of ultrasonic-waves transmitted from a ultrasonic-wave transmitter to a ultrasonic-wave receiver, the cutoff being caused by a web being fed between the ultrasonic-wave transmitter and the ultrasonic-wave receiver, including converting ultrasonic-waves received by the ultrasonic-wave receiver, into electric signals, and rectifying the electric signals, smoothing the thus rectified electric signals, sampling the smoothed electric signals at first timing by means of a first sample-holding circuit, sampling the smoothed electric signals at second timing later than the first timing by means of a second sample-holding circuit, sampling an output signal transmitted from the first sample-holding circuit, at the second timing by means of a third sample-holding circuit, and calculating a difference between an output signal transmitted from the second sample-holding circuit and an output signal transmitted from the third sample-holding circuit.

The method may further include selecting the first and second timings out of a period of time in which the smoothed electric signals linearly increase.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENT

A preferred embodiment in accordance with the present invention will be explained hereinbelow with reference to drawings.

Figure 1:
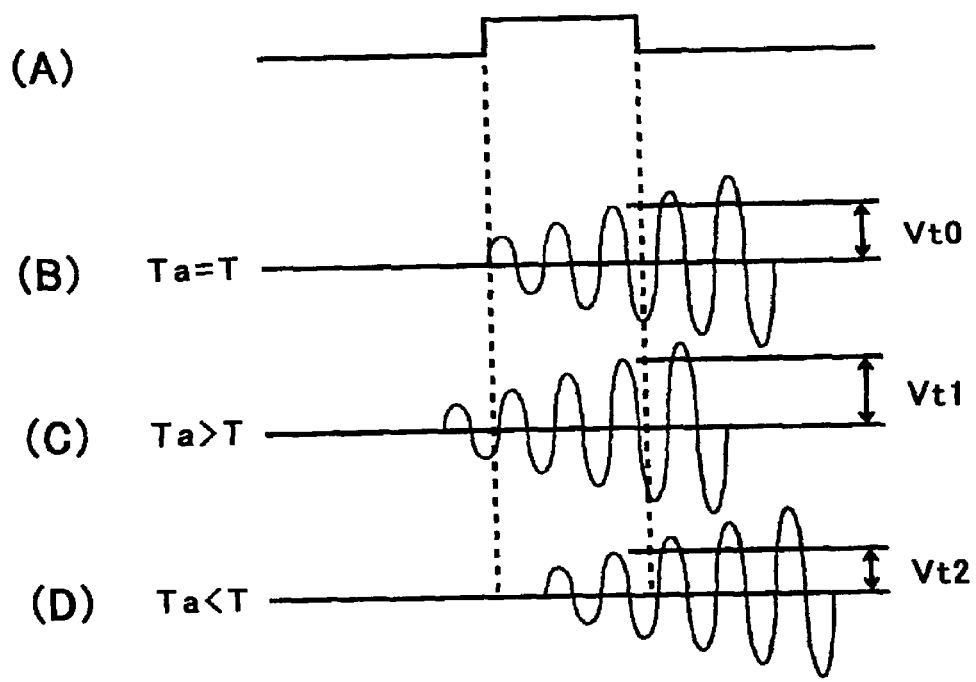
FIG. 1 illustrates waveforms of ultrasonic-waves varying in dependence on ambient temperature in a conventional apparatus for ultrasonically detecting an edge of a web.
Figure 2:
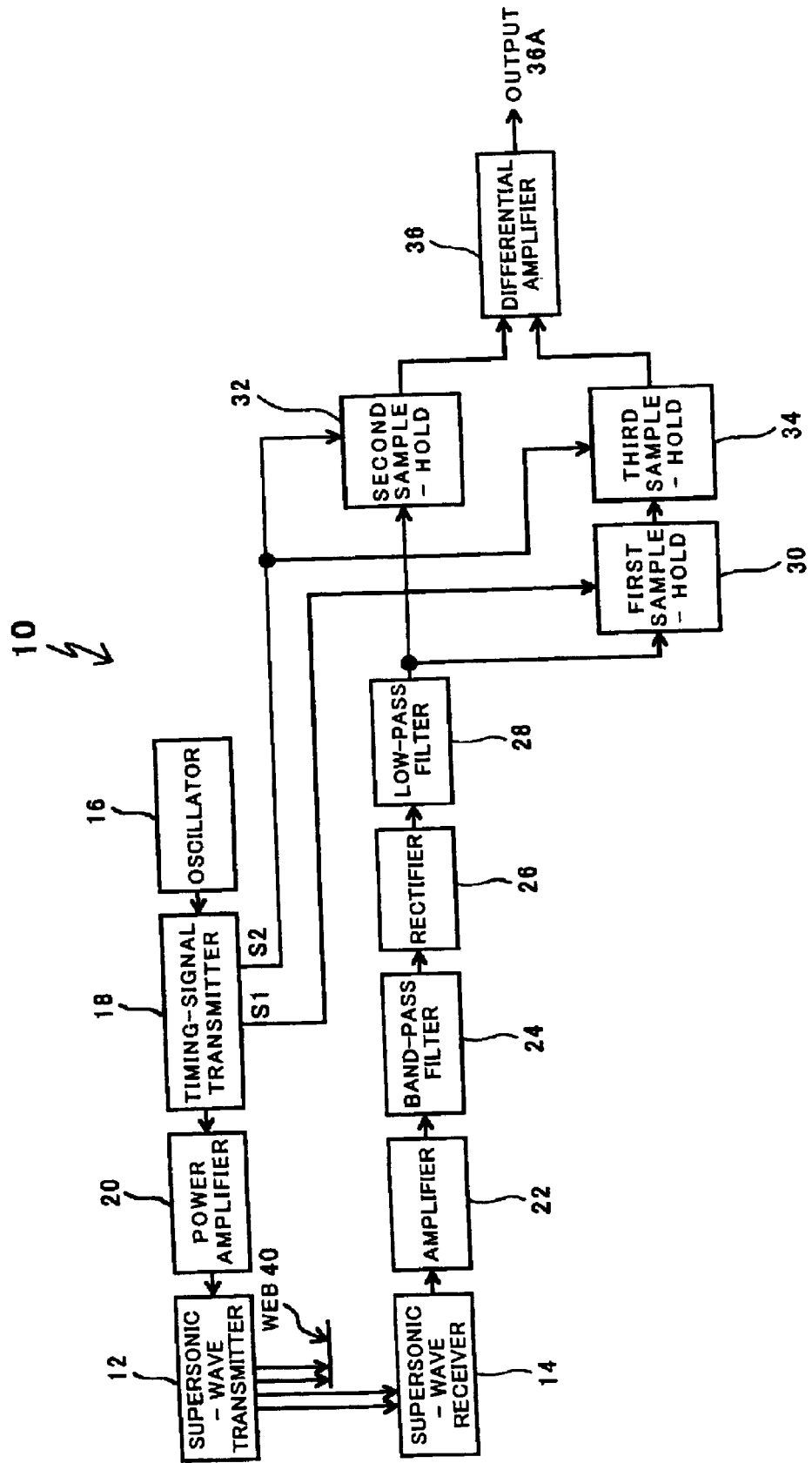
FIG. 2 is a block diagram of an apparatus for ultrasonically detecting an edge of a web, in accordance with a preferred embodiment of the present invention.

FIG. 2 is a block diagram of an apparatus 10 for ultrasonically detecting an edge of a web, in accordance with the first embodiment of the present invention.

The apparatus 10 is comprised of a ultrasonic-wave transmitter 12, a ultrasonic-wave receiver 14, an oscillation circuit 16, a timing-signal transmitting circuit 18, a power amplifying circuit 20, an amplifying circuit 22, a band-pass filter circuit 24, a rectifying circuit 26, a low-pass filter circuit 28, a first sample-holding circuit 30, a second sample-holding circuit 32, a third sample-holding circuit 34, and a differentially amplifying circuit 36.

The timing-signal transmitting circuit 18 transmits a signal T in which ultrasonic-wave pulse train 18A are periodically repeated, a first sample-timing signal S1, and a second sample-timing signal S2.

Figure 3:
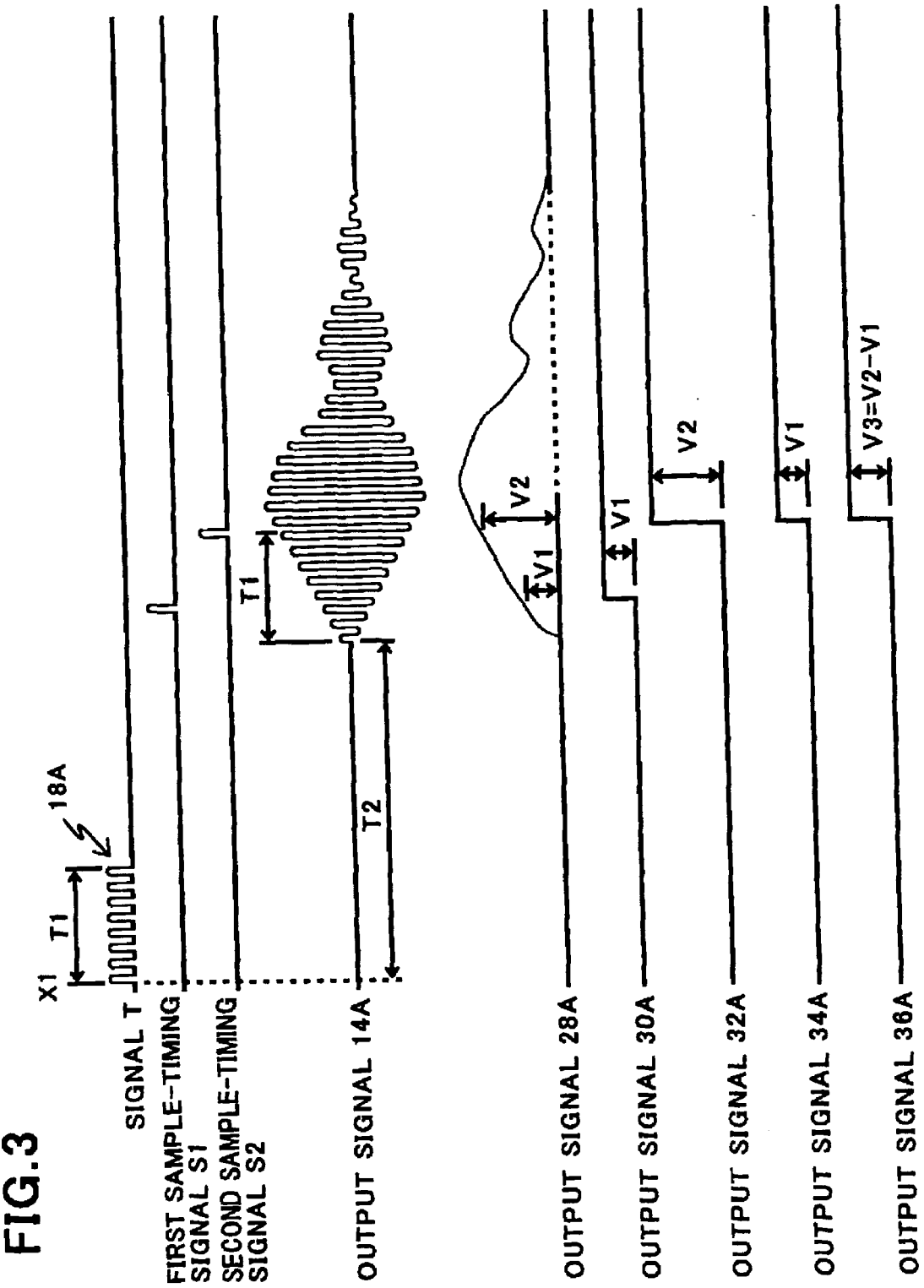
FIG. 3 illustrates waveforms of signals in circuits constituting the apparatus illustrated in FIG. 1.

FIG. 3 illustrates waveforms of the signal T, the first sample-timing signal S1, and the second sample-timing signal S2. As illustrated in FIG. 3, the pulse train 18A in the signal T has duration T1. An interval between adjacent pulses in the pulse train 18A is determined by the timing-signal transmitting circuit 18 so as to be sufficient for an output signal transmitted from the ultrasonic-wave receiver 14 to decay.

The timing-signal transmitting circuit 18 transmits the signal T, the first sample-timing signal S1 and the second sample-timing signal S2 in accordance with a reference signal transmitted from the oscillation circuit 16.

The signal T is transmitted to the power amplifying circuit 20 from the timing-signal transmitting circuit 18, amplified in the power amplifying circuit 20, and then, transmitted to the ultrasonic-wave transmitter 12. The ultrasonic-wave transmitter 12 produces a ultrasonic-wave pulse train in accordance with the signal T received from the power amplifying circuit 20, and irradiates the thus produced ultrasonic-wave pulse train to the ultrasonic-wave receiver 14.

The ultrasonic-wave receiver 14 is located in facing relation to the ultrasonic-wave transmitter 12. A web 40 is kept being fed between the ultrasonic-wave transmitter 12 and the ultrasonic-wave receiver 14.

The ultrasonic-waves transmitted from the ultrasonic-wave transmitter 12 are partially cut off by the web. The ultrasonic-waves which were not cut off by the web 40 reach the ultrasonic-wave receiver 14, and are converted into electric signals by the ultrasonic-wave receiver 14.

The thus converted electric signals are amplified in the amplifying circuit 22, and then, filtered in the band-pass filter circuit 24. Output signals transmitted from the band-pass filter circuit 24 are rectified in the rectifying circuit 26, transmitted to the low-pass filter circuit 28, and then, smoothed in the low-pass filter circuit 28.

The electric signals having been smoothed by the low-pass filter circuit 28 are transmitted to the first sample-holding circuit 30 and the second sample-holding circuit 32. The first sample-holding circuit 30 transmits its output signals to the third sample-holding circuit 34.

The first sample-timing signal S1 is transmitted to the first sample-holding circuit 30 from the timing-signal transmitting circuit 18. When the first sample-holding circuit 30 receives the first sample-timing signal S1, the first sample-holding circuit 30 samples an output signal transmitted from the low-pass filter circuit 28.

Similarly, the second sample-timing signal S2 is transmitted to the second and third sample-holding circuits 32 and 34 from the timing-signal transmitting circuit 18. When the second sample-holding circuit 32 receives the second sample-timing signal S2, the second sample-holding circuit 32 samples an output signal transmitted from the low-pass filter circuit 28. When the third sample-holding circuit 34 receives the second sample-timing signal S2, the third sample-holding circuit 34 samples an output signal transmitted from the first sample-holding circuit 30.

The second and third sample-holding circuits 32 and 34 transmit their output signals to the differentially amplifying circuit 36. The differentially amplifying circuit 36 calculates a difference between the output signals received from the second and third sample-holding circuits 32 and 34, and then, transmits an output signal 36A indicative of the calculated difference.

FIG. 3 illustrates waveforms of the signal T including a driving pulse train 18A transmitted to the ultrasonic-wave receiver 12 from the timing-signal transmitting circuit 18, the first sample-timing signal S1, the second sample-timing signal S2, an output signal 14A transmitted from the ultrasonic-wave receiver 14, an output signal 28A transmitted from the low-pass filter circuit 28, an output signal 30A transmitted from the first sample-holding circuit 30, an output signal 32A transmitted from the second sample-holding circuit 32, an output signal 34A transmitted from the third sample-holding circuit 34, and an output signal 36A transmitted from the differentially amplifying circuit 36.

Hereinbelow is explained an operation of the apparatus 10 in accordance with the first embodiment.

As illustrated in FIG. 3, it is assumed that a driving pulse train 18A having duration T1 is applied to the ultrasonic-wave transmitter 12 at time X1.

On receipt of the driving pulse train 18A, the ultrasonic-wave transmitter 12 transmits ultrasonic-waves to the receiver 14. After the ultrasonic-wave receiver 14 received the ultrasonic-waves from the ultrasonic-wave transmitter 12 and when a period of time T2 (T2>T1) has passed since the time X1, an amplitude of the output signals 14A transmitted from the ultrasonic-wave receiver 14 starts gradually increasing.

Even after the ultrasonic-wave receiver 12 received ultrasonic-waves directly driven by the driving pulse train 18A having been applied to the ultrasonic-wave transmitter 12, that is, even after the cycle T1 has passed since the ultrasonic-wave reached the ultrasonic-wave receiver 14, an amplitude of the output signals 14A transmitted from the ultrasonic-wave receiver 14 keeps increasing. After the amplitude of the output signals 14A reached a peak, the amplitude of the output signals 14A starts attenuating.

Increase in an amplitude of the output signals 14A even after the lapse of the time T1 is caused by reverberant vibration of the ultrasonic-wave receiver 12 and reflected ultrasonic-waves.

An amplitude of the output signals 14A in the cycle T1 is stable. That is, by rectifying the output signals 14A by the rectifying circuit 26 and further smoothing the output signals 14A by the low-pass filter circuit 28, an amplitude of the output signals 14A linearly increase in the cycle T1, as indicated with a waveform of the output signal 28A transmitted from the low-pass filter circuit 28. This is the fact first discovered by the inventors.

After a certain period of time has passed since application of a driving pulse voltage to the ultrasonic-wave transmitter 12, the timing-signal transmitting circuit 18 transmits the first and second sample-holding signals S1 and S2 in the cycle T1 after the ultrasonic-wave receiver 14 received ultrasonic-waves, as illustrated in FIG. 3.

Timings at which the first and second sample-timing signals S1 and S2 are transmitted are determined in such a way that the first and second sample-timing signals S1 and S2 are transmitted within the duration T1 without fail in a range of expected ambient temperature, even if the time T2 is varied in dependence on temperature variance.

The first sample-holding circuit 30 samples the output signal 28A transmitted from the low-pass filter circuit 28, when receiving the first sample-timing signal S1 from the timing-signal transmitting circuit 18.

The second sample-holding circuit 32 samples the output signal 28A transmitted from the low-pass filter circuit 28, when receiving the second sample-timing signal S2 from the timing-signal transmitting circuit 18.

The third sample-holding circuit 34 samples the output signal 30A transmitted from the first sample-holding circuit 30, when receiving the second sample-timing signal S2 from the timing-signal transmitting circuit 18 for making a timing of the output signal 30A to coincide with a timing of the output signal 32A.

The differentially amplifying circuit 36 receives the output signals 32A transmitted from the second sample-holding circuit 32 and the output signals 34A transmitted from the third sample-holding circuit 34, and then, calculates a difference between the output signals 32A and 34A. As a result, there is obtained a level difference in the output signals 28A having been sampled when the first and second sample-timing signals S1 and S2 were received. In other words, there is obtained an inclination of a linear portion in the signal having been smoothed by the low-pass filter circuit 28.

Figure 4:
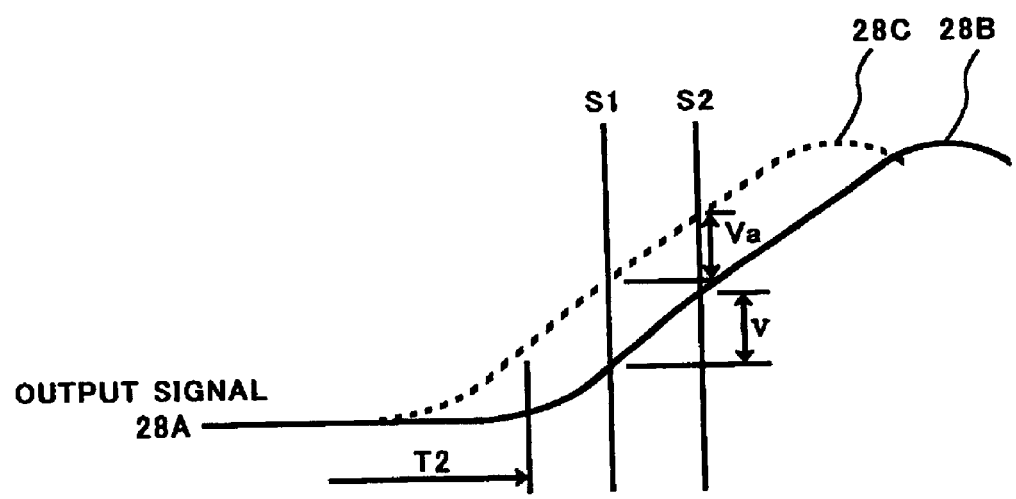
FIG. 4 illustrates waveforms of output signals transmitted from the low-pass filter circuit.

FIG. 4 illustrate waveforms of the output signals 28A transmitted from the low-pass filter circuit 28, in the case that the time T2 is varied due to temperature variance. It is assumed that a waveform 28B of the output signal 28A shown with a solid line is changed to a waveform 28C shown with a broken line.

As mentioned above, a level difference in the output signals 28A having been sampled when the first and second sample-timing signals S1 and S2 were received is calculated in the apparatus 10 in accordance with the first embodiment. If temperature variance does not occur and hence the time T2 is not varied, there is obtained a level difference V in the output signals 28A having been sampled when the first and second sample-timing signals S1 and S2 were received. If the time T2 is varied due to temperature variance, and hence, a waveform of the output signal 28A is varied to a waveform 28C, there is obtained a level difference Va in the output signals 28A having been sampled when the first and second sample-timing signals S1 and S2 were received.

Since the waveforms 28B and 28C are similar to each other, they have the same inclination. Hence, the level difference V calculated on the waveform 28B is equal to is equal to the level difference Va calculated on the waveform 28C (V=Va).

Thus, since the apparatus 10 in accordance with the first embodiment calculates a level difference in the output signals 28A having been sampled when the first and second sample-timing signals S1 and S2 were received, it would be possible to obtain the accurate level difference V, even if the time T2 is varied due to temperature variance, and further possible to detect only a level of ultrasonic-waves driven directly by the driving pulse train 18A.

As a result, even if the time T2, that is, a period of time necessary for ultrasonic-waves to reach the ultrasonic-wave receiver 14 from the ultrasonic-wave transmitter 12 is varied due to temperature variance, it would be possible to accurately detect an edge of the web 40 without being influenced by reverberant vibration and reflected ultrasonic-waves.

Though the apparatus 10 in accordance with the above-mentioned first embodiment is used to detect an edge of the web 40, the apparatus 10 may be used to detect a thickness of the web 40.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2001-292168 filed on Sep. 25, 2001 including specification, claims, drawings and summary is incorporated herein by reference in its entirety.

What is claimed is:

1. An apparatus for ultrasonically detecting an edge of a web, comprising:

a ultrasonic-wave transmitter transmitting ultrasonic-wave pulse train;

a ultrasonic-wave receiver arranged in facing relation to said ultrasonic-wave transmitter, receiving said ultrasonic-wave pulse train, and converting the received ultrasonic-wave pulse train into electric signals, said web being fed between said ultrasonic-wave transmitter and said ultrasonic-wave receiver;

a rectifying circuit for rectifying said electric signals;

a low-pass filter circuit for smoothing output signals transmitted from said rectifying circuit;

a first sample-holding circuit for sampling an output signal transmitted from said low-pass filter circuit, at first timing;

a second sample-holding circuit for sampling an output signal transmitted from said low-pass filter circuit, at second timing later than said first timing;

a third sample-holding circuit for sampling an output signal transmitted from said first sample-holding circuit, at said second timing; and a differentially amplifying circuit for calculating a difference between an output signal transmitted from said second sample-holding circuit and an output signal transmitted from said third sample-holding circuit.

2. The apparatus as set forth in claim 1, wherein said first and second timings are selected out of a period of time in which the smoothed electric signals linearly increase.

3. A method of ultrasonically detecting an edge of a web, by detecting cutoff of ultrasonic-waves transmitted from a ultrasonic-wave transmitter to a ultrasonic-wave receiver, said cutoff being caused by a web being fed between said ultrasonic-wave transmitter and said ultrasonic-wave receiver, comprising:

converting ultrasonic-waves received by said ultrasonic-wave receiver, into electric signals, and rectifying said electric signals;

smoothing the thus rectified electric signals;

sampling the smoothed electric signals at first timing by means of a first sample-holding circuit;

sampling the smoothed electric signals at second timing later than said first timing by means of a second sample-holding circuit;

sampling an output signal transmitted from said first sample-holding circuit, at said second timing by means of a third sample-holding circuit; and calculating a difference between an output signal transmitted from said second sample-holding circuit and an output signal transmitted from said third sample-holding circuit.

4. The method as set forth in claim 3, further comprising selecting said first and second timings out of a period of time in which the smoothed electric signals linearly increase.

* * * * *